United States Patent [19]

Demoulin

[11] Patent Number: 4,868,012
[45] Date of Patent: Sep. 19, 1989

[54] PROCESS FOR THE MANUFACTURE OF A TEXTILE REINFORCEMENT

[75] Inventor: Bernard Demoulin, Peronne, France

[73] Assignee: Lainiere De Picardie, S.A., Peronne, France

[21] Appl. No.: 182,899

[22] Filed: Apr. 18, 1988

[30] Foreign Application Priority Data

Apr. 17, 1987 [FR] France .................... 87 05496

[51] Int. Cl.$^4$ .................................................. B05D 5/10
[52] U.S. Cl. .................................. 427/208.2; 156/230; 156/238
[58] Field of Search ............... 428/196, 200, 328, 227, 428/331, 346, 347, 349, 355, 356; 427/208.2; 156/230, 238

[56] References Cited

U.S. PATENT DOCUMENTS

| | | |
|---|---|---|
| 3,330,713 | 7/1967 | Watson et al. ............... 156/247 |
| 3,941,904 | 3/1976 | Hoh et al. ................. 427/208.2 |
| 4,133,796 | 1/1979 | Bullman ..................... 427/208.2 |
| 4,333,980 | 6/1982 | Russell ......................... 428/200 |
| 4,731,274 | 3/1988 | Ishida ........................... 428/200 |
| 4,755,424 | 7/1988 | Takeoka et al. ............... 427/40 |
| 4,780,358 | 10/1988 | Ito et al. ........................ 428/220 |

*Primary Examiner*—Stanley Silverman
*Attorney, Agent, or Firm*—Mason, Fenwick & Lawrence

[57] ABSTRACT

The invention relates to a process for the manufacture of textile reinforcements. The adhesive of the invention comprises a filler consisting of inert particles 1 which limit the penetration of the adhesive 3 into the fabrics.

The process of manufacture of textile reinforcements of the invention uses this adhesive. It preferably comprises a transfer stage and can be operated without heating the substrate.

The invention also relates to the products obtained.

9 Claims, 1 Drawing Sheet

PROCESS FOR THE MANUFACTURE OF A TEXTILE REINFORCEMENT

The invention relates to a process for the manufacture of a textile reinforcement, and to the fabric obtained.

Reinforcing webs are traditionally used to impart to fabrics a suppleness or a springiness which they do not possess by themselves. At present, these reinforcing webs are frequently fixed onto the fabrics by glueing by means of a polymer-based adhesive.

During application of this adhesive to the reinforcement or to the fabric it is necessary to avoid excessive penetration of polymers into the textile. In fact, excessive penetration causes strike-throughs which can cause an adhesion of the polymer to the second face of the textile, such adhesion being particularly troublesome when the fabric is subjected to stresses due to pressure, heat or steaming.

It is an object of the present invention to propose a technique which avoids these strike-throughs and provides a reinforced product of quality.

It is a further object of the invention to propose a technique which permits reinforcement, with the aid of adhesive products, of fabrics which cannot be treated by the conventional methods because their surface is too irregular.

For this purpose, there is proposed a process for the manufacture of a textile reinforcement in which an adhesive comprising a filler consisting of approximately spherical inert particles distributed homogeneously within the adhesive is coupled to a textile substrate. The coupling of the adhesive to the substrate is achieved by transfer, without heating the substrate.

There is further proposed a fabric obtained by the process mentioned above.

The invention will be elaborated in the description which now follows, with reference to the drawings in which.

Figure 1:
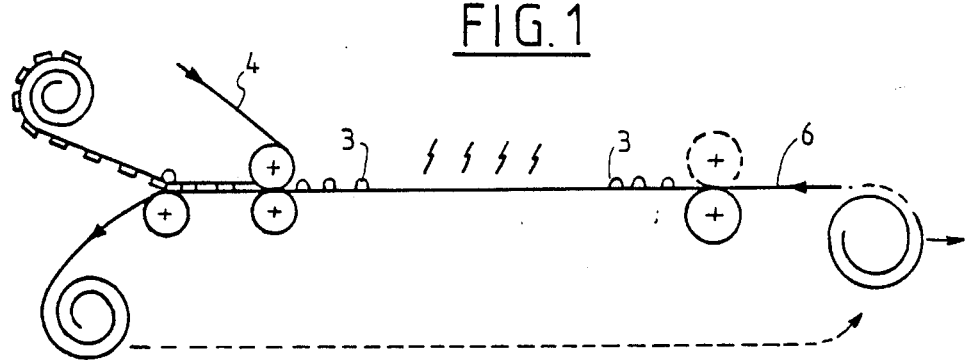
FIG. 1 is an embodiment of the process.
Figure 2:
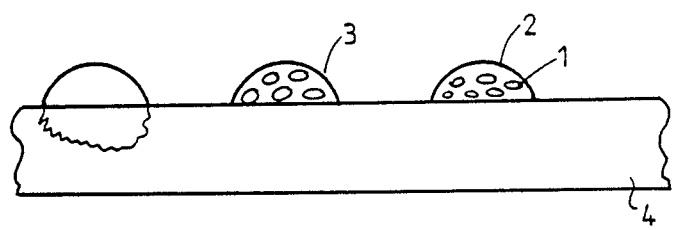
FIG. 2 is a cross-section of the fabric.
Figure 3:
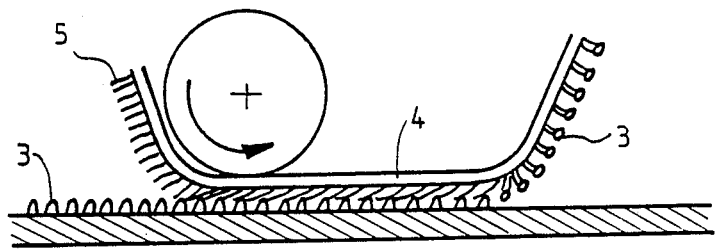
FIG. 3 is a cross-section of a second embodiment of the fabric.

The adhesive based on heat-sealing and hot-melt polymers for a textile comprises, according to the invention, a filler consisting of approximately spherical inert particles 1 distributed homogenously within the adhesive.

The polymers 2 used can be any employed in the textile field. They can be, for example, copolyamides, copolyesters, certain of their derivatives or a mixture of these products. They are used in dispersion in water, alcohol or another polar solvent and, at ambient temperature, are in the form of a paste. The size of the polymer particles is generally between 0.1 and 100 microns. The properties of the paste are often improved by adding thickeners (acrylate or polyacrylate), dispersing agents, thixotropic agents, antifoams and pigmenting agents.

Surprisingly, it has been found that the addition to an adhesive of a filler consisting of inert particles makes it possible to improve its properties and to limit its penetration into the fabric during application. As a result of a mechanical effect, the penetration of this filler into the textile is very limited if not impossible and the particles composing the filler hold back the polymers, which they coat, thus preventing their penetration into the fabric.

This effect persists when a moderate pressure to ensure good contact between the adhesive and the textile is applied.

Since the properties of the adhesive according to the invention result from this mechanical effect, the principal property desired for the filler is the inertness of the products of which it is composed relative to other components of the adhesive and relative to the textiles onto which they must be applied. It is preferable to use a product in which it is possible to obtain particles of relatively constant dimensions.

Thus it is possible to use an inorganic filler, for example based on silica or a metal silicate, calcium salts (carbonate or sulphate), chalk, glass microspheres, talc, metal salts (chromium, vanadium, zinc, etc.) and, preferably, titanium dioxide, which is known for its complete chemical inertness towards the thickeners used in the adhesive.

It is also possible to use a thermoplastic organic filler, for example based on polyethylene or polypropylene, polystyrene or any polymer whose melting point is above the temperature to which the adhesive has to be raised during its use. It is also possible to use thermosetting organic fillers such as pre-crosslinked phenoplasts, precrosslinked aminoplasts or any other micronizable thermoset resin.

According to a preferred embodiment, the diameter of the particles constituting the filler of the adhesive is between 0.1 and 10 microns or furthermore, according to another method of measurement, these particles must have a BET specific surface area of between 25 and 400 $m^2/g$. In effect, taking account of the size of the polymer particles generally employed, particles of this size are very well coated by the polymers and it is possible to make very sure of the homogeneity of the mixture.

According to a preferred embodiment of the adhesive, the mass of filler which it contains represents between 1 and 10% of its total mass. In fact, this particle density, in combination with the other properties of the adhesive, makes it possible to achieve optimum results both as regards the adhesiveness of the product and as regards its absence of penetration of the fabric to which it is applied.

The process of manufacture of textile reinforcements according to the invention uses the adhesive described above.

In fact, in view of the properties of this adhesive, it is possible to apply the adhesive to the textile under conditions which permit a good level of adhesion whilst limiting the penetration of the polymers into the fabric, and without strike-through.

According to a preferred embodiment, the coupling of the adhesive to the textile substrate is achieved by transfer, without heating the substrate.

In that case, the adhesive is first deposited on a transfer carrier 6 and then transferred from the transfer carrier 6 onto the substrate 4.

According to a preferred embodiment, the pressure exerted during the coupling of the adhesive 3 to the substrate 4 is between 1 kg/$m^2$ and 10 kg/$m^2$ for a period of between 0.01 s and 0.1 s. The filler limits the deformation of the adhesive during exertion of this pressure. Thus, the patterns which the adhesive constitutes and the volume of the dots are preserved. The quality of the product obtained and in particular its adhesive capacity for its subsequent use are improved.

The adhesive 3 can advantageously consist of an array of dots of diameter between 350 and 750 microns distributed over the substrate, thereby retaining high suppleness of the reinforced product.

First, droplets 3 of a dispersion of heat-sealing adhesive are deposited on the at least partially non-stick transfer carrier 6. Thereafter, the droplets thus unitially deposited on the transfer carrier 6 are heated so as to dry the deposited dispersion and fuse the heat-sealing adhesive of which it consists. Thereafter, the droplets thus treated and present on the transfer carrier 6 are brought into contact with the textile substrate 4 without heating the latter, the heat-sealing adhesive being transferred from the transfer carrier 6 onto the textile substrate 4 in the form of dots without however penetrating into the substrate 4.

According to the invention, since the penetration of the textile substrate is slight it is possible to deposit the adhesive directly on a cloth, which considerably simplifies the reinforcement technique overall. The effects thus obtained in respect of suppleness or springiness of the fabric are comparable to those produced by coupling to a reinforcing fabric.

The absence of heating of the substrate during transfer makes it possible to use this technique even on fragile cloths. The shape of the patterns constituted by the adhesive is determined by the desired properties (springiness and bulk). Elongated shapes or fibers confer a springiness in the perpendicular direction to the fabric. A grid can accordingly produce varied effects. These lines or these patterns can be continuous or can consist of a succession of dots or short strokes. Furthermore, it is possible, with the adhesive according to the invention, to apply the process to a substrate 4 which has an irregular surface. In particular, it can have a high density of fibrils 5 at its surface and essentially at right angles thereto.

Since the surface of the textile is defined by the weft, the orientation of the fibrils 5, when they are not subjected to any stress, is essentially at right angles thereto.

During coupling of the substrate 4 to the adhesive 3, the fibrils 5 are caused to lay flat and prevent contact between the elements of the textile substrate and the adhesive. The adhesive 3 is thus deposited on the fibrils 5 to which it adheres and which subsequently resume their original orientation at right angles to the textile weft. The suppleness and bulk of the fabric thus obtained are remarkable and prove satisfactory in many applications.

Using the technique proposed, it is thus made possible to deposit the adhesive on the fibrils. The presence of fibrils even makes it possible to facilitate the coating of the substrate with the adhesive because the possible surface irregularities of the weft are compensated by the fibrils when they are laid flat. The surface presented to the adhesive during transfer is thus very regular. During deposition of the adhesive carried out by means of a coating drum, the holes of the drum are always efficiently unblocked. It is thus possible to produce a variety of patterns depending on the effect (bulk and springiness) which it is desired to obtain. These patterns can consist of continuous lines, of dots or of short strokes.

What is claimed is:

1. Process for the manufacture of textile reinforcement of the type in which a heat-sealing hot-melt adhesive is coupled to a textile substrate characterized in that the adhesive comprises a filler consisting of approximately spherical inert particles distributed homogeneously within the adhesive, said particles holding back the adhesive and preventing its penetration into the fabric, the mean diameter of the particles contained in the adhesive is between 0.1 and 10 microns, the particles represent between 1% and 10% of the mass of the adhesive, the BET of the particles being comprised between 25 and 400 m$^2$/g characterized in that the coupling of the adhesive to the textile substrate is carried out by transfer, without heating the substrate.

2. Process according to claim 1, characterized in that the pressure exerted during the coupling of the adhesive to the substrate is between 1 kg/m$^2$ and 10 kg/m$^2$, for a period of between 0.01 s to 0.1 s.

3. Process according to claim 1, characterized in that the adhesive consists of an array of dots distributed over the substrate.

4. Process according to claim 3, characterized in that the diameter of the adhesive dots is between 350 and 750 microns.

5. Process according to claim 1, characterized in that the textile substrate is a cloth.

6. Process according to claim 1, characterized in that the surface condition of the textile substrate is irregular.

7. Process according to claim 1, characterized in that the textile substrate possesses a high density of fibrils at its surface and essentially at right angles thereon.

8. Process according to claim 7, characterized in that during the coupling of the adhesive to the textile substrate the fibrils are laid flat and the adhesive is deposited on the fibrils.

9. Process for the manufacture of textile reinforcement of the type in which a heat-sealing hot-melt adhesive is coupled to a textile substrate, characterized in that the adhesive comprises a filler consisting of approximately spherical inert particles contained in the adhesive representing between 1% and 10% of its mass, the BET of the particles being comprised between 25 and 400 m$^2$/g and the heat-sealing hot-melt adhesive being coupled to a textile substrate, the coupling of the adhesive to the textile substrate is carried out by transfer, without heating the substrate, the pressure exerted during the coupling of the adhesive to the substrate being between 1 kg/m$^2$ and 10 kg/m$^2$ for a period of between 0.01 s and 0.1 s, the adhesive consisting of an array of dots distributed over the substrate and of diameter between 350 and 750 microns, the textile substrate being cloth of which the surface condition of the textile substrate is irregular and which has a high density of fibrils at its surface and essentially at angles thereto, the fibrils being laid flat and the adhesive being deposited on the fibrils, said particles holding back the adhesive and preventing its penetration into the fabric.

* * * * *